US006525306B1

United States Patent
Bohn

(10) Patent No.: US 6,525,306 B1
(45) Date of Patent: Feb. 25, 2003

(54) COMPUTER MOUSE WITH INTEGRAL DIGITAL CAMERA AND METHOD FOR USING THE SAME

(75) Inventor: David D. Bohn, Ft Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/558,433

(22) Filed: Apr. 25, 2000

(51) Int. Cl.[7] .................................................. G09G 5/00
(52) U.S. Cl. ....................................... 250/221; 345/163
(58) Field of Search ............................ 250/221, 222.1, 250/224, 227.11, 227.2; 345/163, 157, 164, 166

(56) References Cited

U.S. PATENT DOCUMENTS

| 5,089,712 A |   | 2/1992  | Holland ........................ 250/557 |
| 5,355,146 A | * | 10/1994 | Chiu et al. ................... 345/156 |
| 5,420,943 A | * | 5/1995  | Mak ............................ 382/313 |
| 5,517,211 A | * | 5/1996  | Kwang-Chien ............. 345/166 |
| 5,574,804 A | * | 11/1996 | Olschafskie et al. ........ 382/313 |
| 5,578,813 A |   | 11/1996 | Allen et al. ................ 250/208.1 |
| 5,909,209 A | * | 6/1999  | Dickinson ................... 345/163 |
| 5,994,710 A |   | 11/1999 | Knee et al. ................. 250/557 |

OTHER PUBLICATIONS

Pages from Philips Semiconductors web page "Digital Still Camera" (3 pages). 2000.
Page from Texas Instruments web page "Digital Still Camera System" p. 1 of 1. 1999.

* cited by examiner

*Primary Examiner*—Robert H. Kim
*Assistant Examiner*—Hoon K. Song

(57) ABSTRACT

A computer accessory according to one embodiment of the present invention may comprise a housing and an icon pointing system mounted within the housing. The icon pointing system generates icon pointing data during selected times in order to control a position of an icon associated with a host computer system connected to the computer accessory. An imaging system mounted within the housing produces image data during selected times, the image data being representative of an image of a selected object. A data transmission system operatively associated with the icon pointing system and the imaging system transmits the icon pointing data and the image data to the host computer.

18 Claims, 5 Drawing Sheets

COMPUTER MOUSE WITH INTEGRAL DIGITAL CAMERA AND METHOD FOR USING THE SAME

FIELD OF INVENTION

This invention relates to computer accessories in general and more specifically to a computer mouse having an integral digital camera.

BACKGROUND

Digital cameras are well-known in the art and are analogous to ordinary film-type cameras, except that the film is replaced with an electronic photosensor array (e.g., a two-dimensional charged-coupled-device or CCD). The electronic photosensor array converts the light received by the camera into electronic signals, which are digitized and stored as digital image data. The digital image data may be stored in an electronic memory system, such as random access memory (RAM), associated with the camera. Alternatively, the digital image data may be stored on a magnetic or optical disk of the type commonly used to store digital data.

Digital cameras offer considerable advantages over conventional film-type cameras in that the digital image data may be stored, processed, and/or reproduced with ease. The relative ease of handling and processing the digital image data produced by digital cameras allows users to readily enlarge, reduce, or otherwise modify the digital image data to create any of a wide range of photographic effects and styles.

Most digital cameras comprise autonomous or "stand alone" devices that are designed to be used independently from any other device (e.g., a computer). That is, most digital cameras are provided with self-contained power and memory systems which allow users to capture and store a number of separate image frames or pictures. Consequently, such stand-alone digital cameras are analogous to conventional film-based cameras, except that the various images are stored as digital data rather than as chemical changes on a roll of film.

The digital image data captured and stored by such a digital camera ultimately needs to be transferred or downloaded to a separate image processing system (e.g., a personal computer) in order to further process the image data and/or to fix the image data in a tangible form. The image processing system may also provide for the more permanent storage of the digital image data, such as by allowing the user to store the digital image data on either magnetic or optical media associated with the image processing system.

While such stand-alone digital cameras are convenient for many applications, they are not particularly convenient for other types of applications. For example, one application that is becoming increasingly popular is for computer users to transmit photographs to other users via a computer network system, such as the Internet. Most such photographs are typically transmitted via electronic mail or E-mail, although other data transfer systems exist and may also be used. A user desiring to transmit a conventional photograph as an attachment to an E-mail file must first scan the image (e.g., via an image scanner) in order to produce a digital image file that is representative of the photograph. The digital image file then may be attached to the desired E-mail file. Alternatively, if the photograph is stored in the memory system of a digital camera, the user may accomplish the foregoing task by first downloading the digital image file from the camera onto the computer and then by attaching the digital image data to the E-mail file.

While the process of downloading a photograph from a digital camera is effective from a functional standpoint, it is somewhat cumbersome and inconvenient in that it requires the extra step of downloading to the computer the desired image data before the file can be attached to the E-mail file. Also, since most digital cameras produce image data that are of considerably higher quality than is desired by most users that plan on transferring the image data via E-mail, the use of many of the currently available digital cameras amounts to a certain degree of overkill. As mentioned above, another problem with the image transfer process is that it involves the extra step of connecting the digital camera to the personal computer system before the digital image files can be downloaded. While this may not be difficult for sophisticated users, it can be difficult and intimidating for less-sophisticated users or for young children.

SUMMARY OF THE INVENTION

A computer accessory according to one embodiment of the present invention may comprise a housing sized to receive an icon pointing system. The icon pointing system generates icon pointing data during selected times in order to control a position of an icon associated with a host computer system connected to the computer accessory. An imaging system mounted within the housing produces image data during selected times, the image data being representative of an image of a selected object. A data transmission system operatively associated with the icon pointing system and the imaging system transmits the icon pointing data and the image data to the host computer.

Also disclosed is a method for operating a computer accessory that comprises the steps of: Using the computer accessory as a pointing device during a selected time to control a position of an icon displayed on a display device associated with the host computer; and using the computer accessory as a camera during another selected time to capture an image of a selected object.

Another method for operating a computer accessory, comprises the steps of: Using the computer accessory as a pointing device to move an icon display device associated with a host computer connected to the computer accessory to a desired location; using the computer accessory as a camera to capture an image of a selected object and to produce image data relating thereto; and displaying the image data at the desired location on the display device associated with the host computer.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
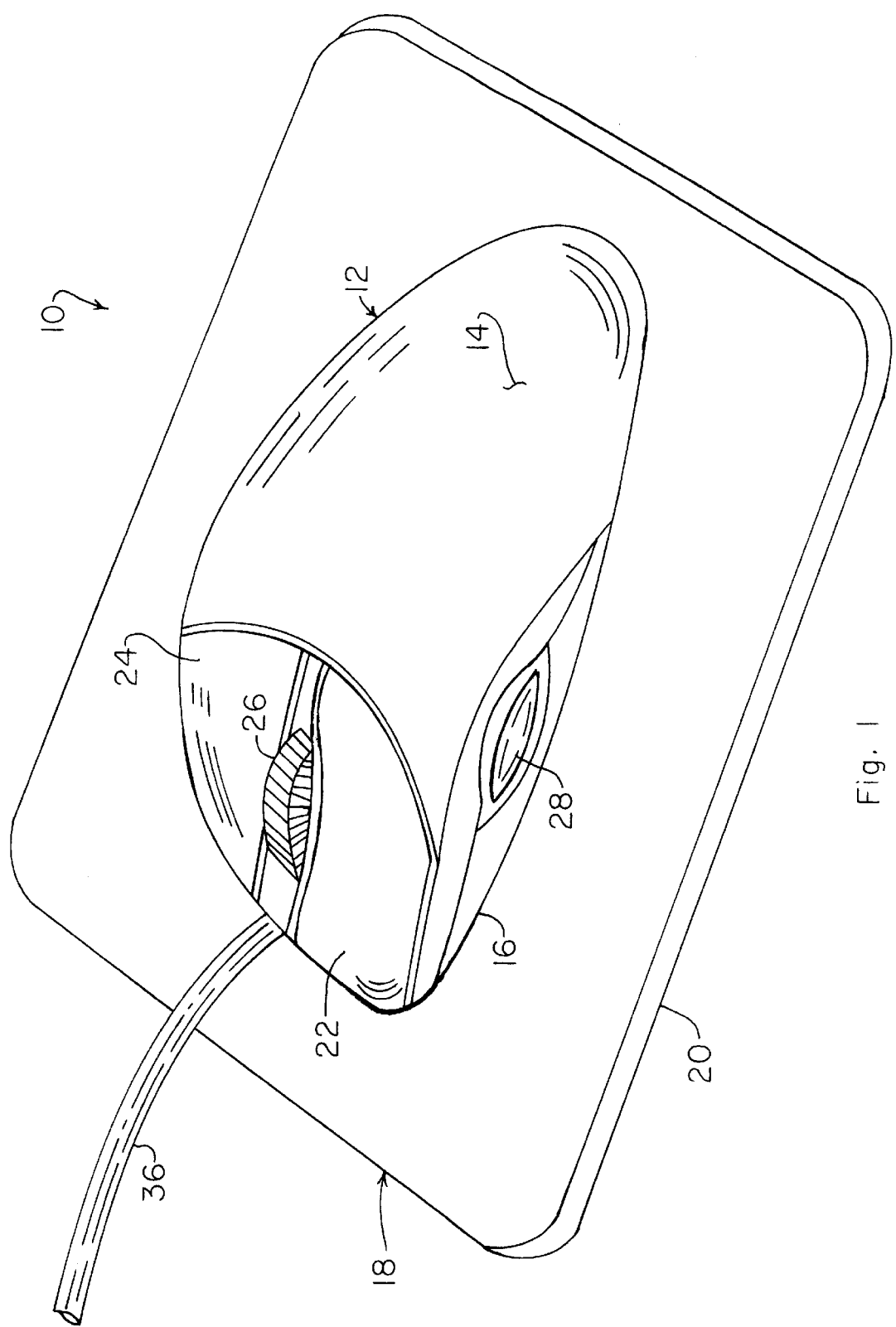
FIG. 1 is a perspective view of a computer accessory according to one embodiment of the present invention having an icon pointing system and integral digital camera.

A computer accessory 10 according to one preferred embodiment of the present invention is illustrated in FIG. 1 and provides the functionality of both a computer mouse and a digital camera in a single unit. That is, the computer accessory 10 may be used to provide the icon pointing functions typically associated with a computer mouse as well as the image capturing functions typically associated with a digital camera.

Figure 2:
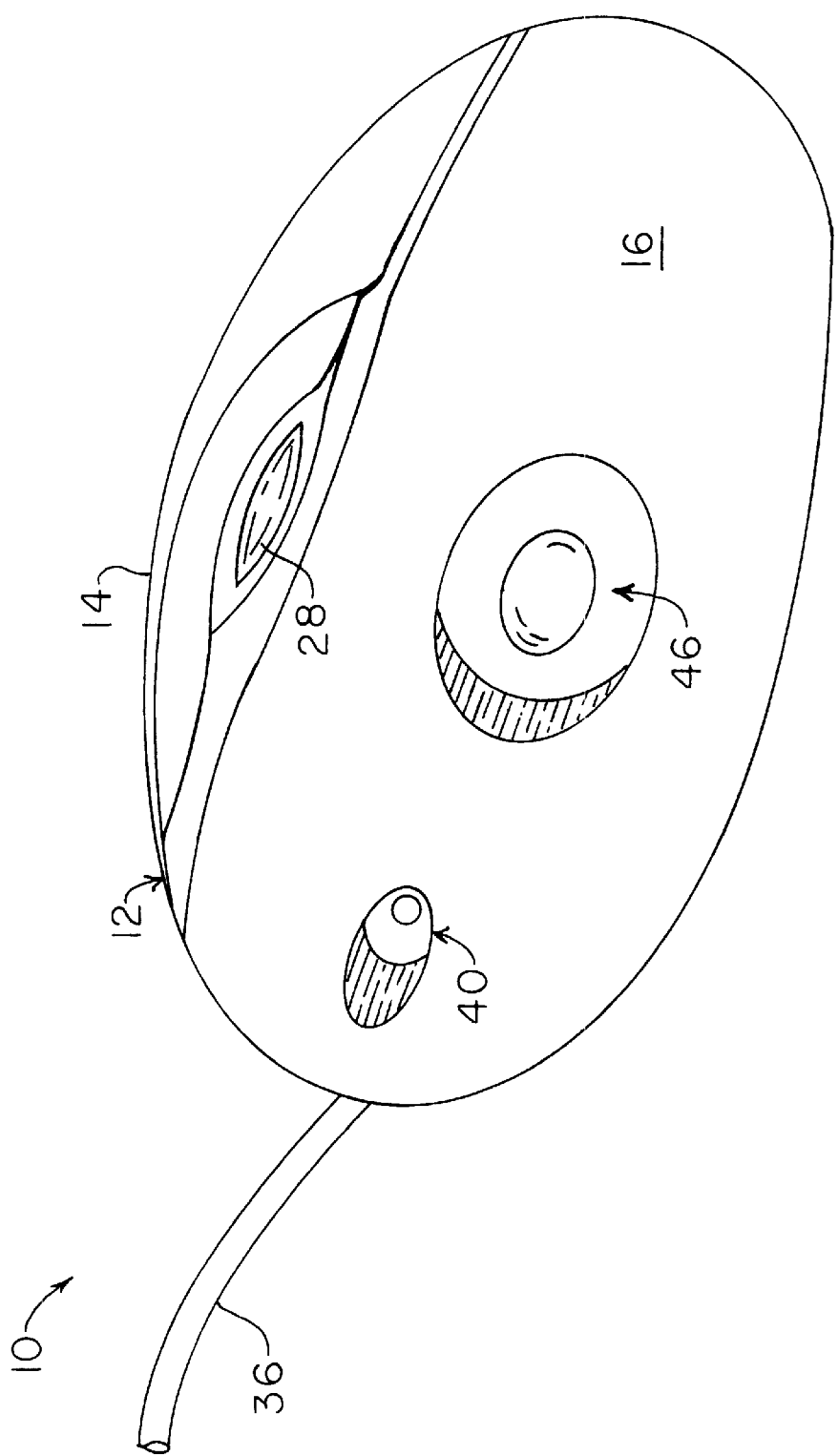
FIG. 2 is a perspective view of the underside of the computer accessory of FIG. 1 showing the optical displacement detection system and the lens of the camera system.
Figure 3:
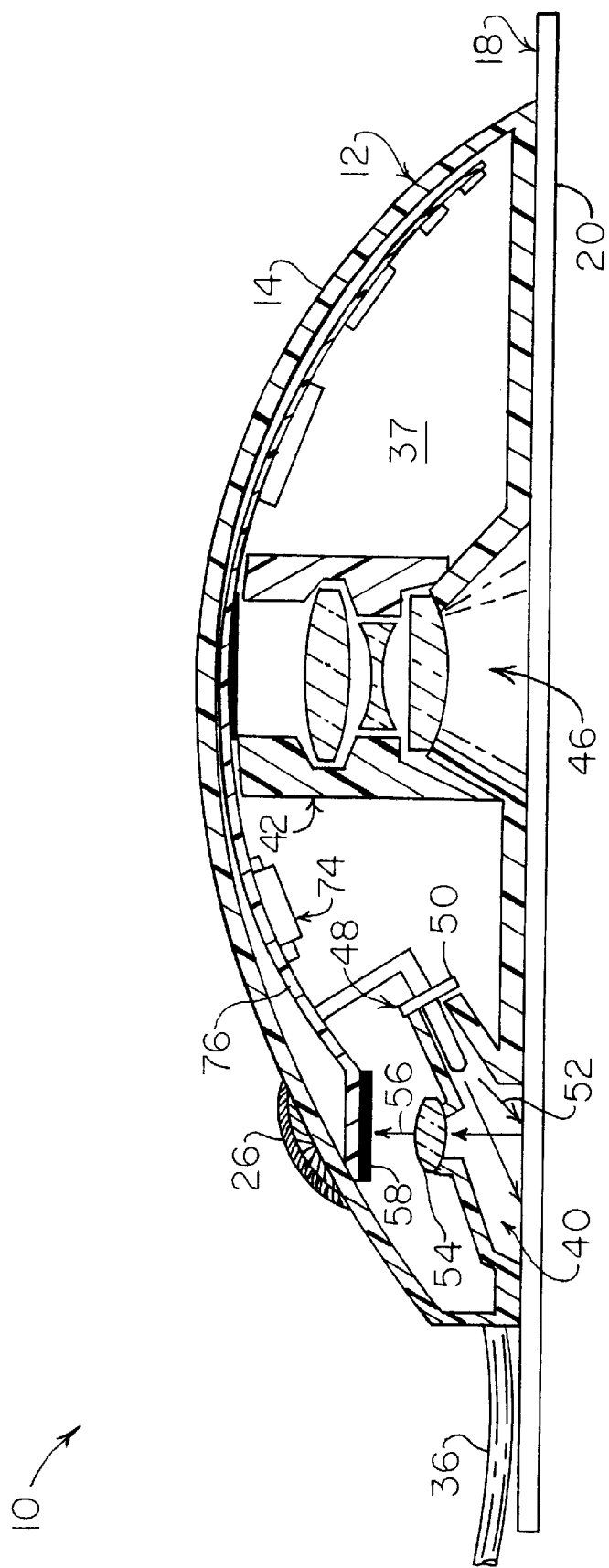
FIG. 3 is a side view in elevation of the computer accessory showing the internal arrangement of the optical displacement detection system and the imaging system.

Referring now to FIGS. 1–3 simultaneously, the computer accessory 10 may comprise a housing 12 having a top surface 14 and a bottom surface 16. The top and bottom surfaces 14 and 16 of housing 12 are sized to receive the various internal components of the computer accessory 10 in the manner that will be described in greater detail below. The top surface 14 of housing 12 also may be shaped to comfortably receive a hand (not shown) of a user (also not shown). The bottom surface 16 of housing 12 may comprise a substantially flat surface configured to glide over a substantially flat or planar reference object 18, such as a mouse pad 20. The housing 12 also may be provided with a pair of mouse buttons 22, 24 and a scroll wheel 26 which allow the user to operate the computer accessory 10 in a manner akin to a conventional mouse. A shutter release button 28 provided on the side portion of housing 12 allows the user to operate the computer accessory 10 as a digital camera. The computer accessory 10 may be connected to a host computer 30 (FIG. 4) by any of a wide range of data transmission systems 32, such as, for example, by a universal serial bus (USB) system 34 and associated cable 36 (FIGS. 1–3).

Figure 4:
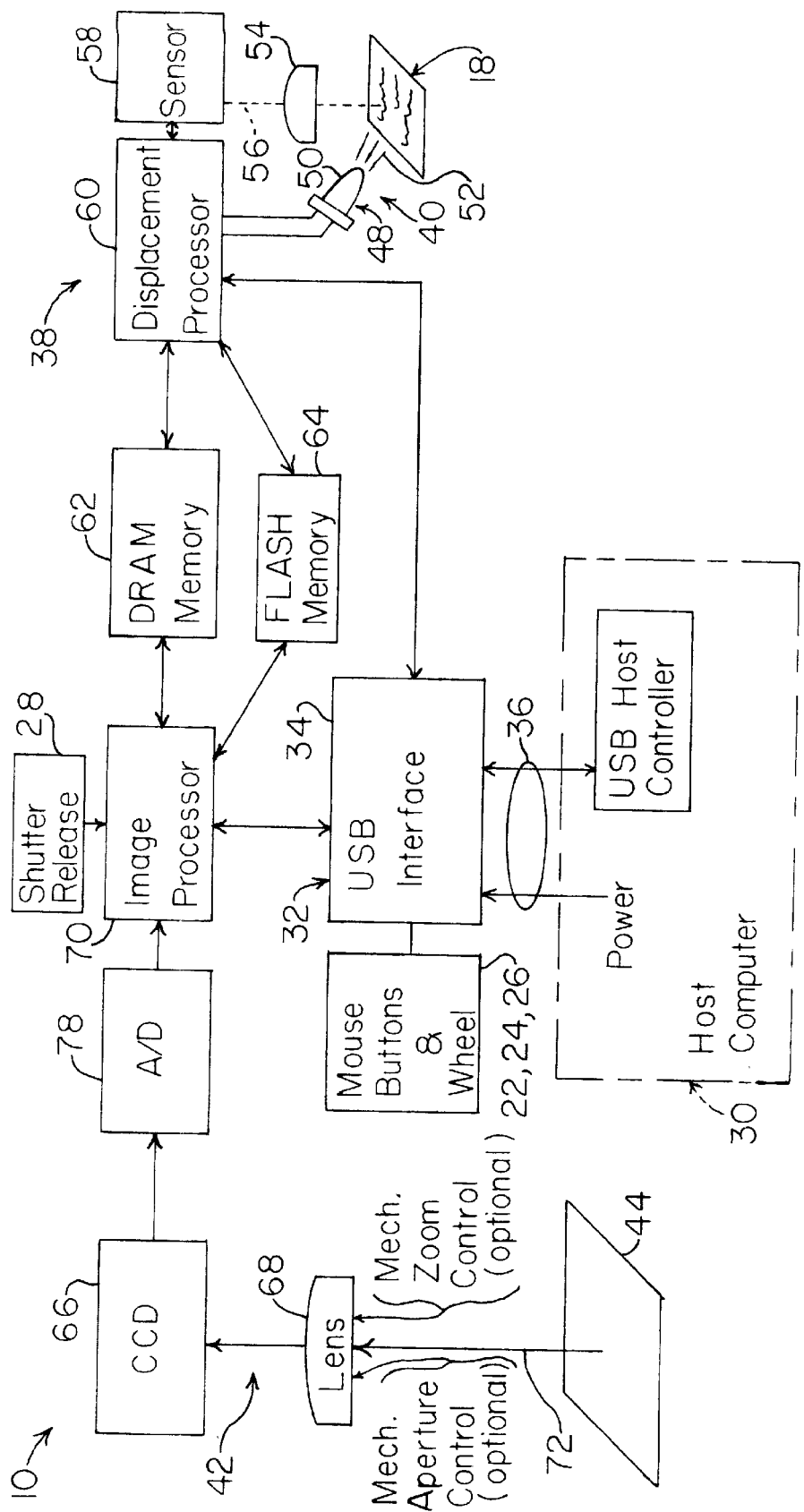
FIG. 4 is a system block diagram of the computer accessory according to the present invention.

With reference now primarily to FIGS. 3 and 4, computer accessory 10 is provided with an icon pointing system 38 which generates icon pointing data (not shown) suitable for controlling a position of an icon (not shown) which may be presented on a display device (also not shown) associated with the host computer system 30. The icon pointing system 38 provides the functionality typically associated with a computer pointing system or mouse. In one preferred embodiment, the icon pointing system 38 may comprise an optical displacement detection system 40 which detects the movement of the computer accessory 10 with respect to the reference object 18 (e.g., the mouse pad 20). Alternatively, and as will be described in greater detail below, other types of icon pointing systems that are now known in the art or that may be developed in the future may be substituted for the optical displacement system 40 shown and described herein.

The computer accessory 10 is also provided with an imaging system 42 which produces image data (not shown) representative of a selected object 44 (shown schematically in FIG. 4) desired to be photographed by the user. The imaging system 42 may be activated by the shutter release button 28 provided on the housing 12. See FIGS. 1 and 2. The image data produced by the imaging system 42 are transferred to the host computer system 30 via the data transmission system 32.

The computer accessory 10 according to the present invention may be operated in at least two modes depending on the function that is desired to be accomplished with the computer accessory 10. A first operational mode that is provided is an icon pointing mode. When operated in this mode, the computer accessory 10 emulates a conventional computer pointing system or mouse. In the embodiment shown and described herein, the icon pointing mode is automatically enabled when the computer accessory 10 is placed on the reference object 18 (e.g., the mouse pad 20). That is, when the computer accessory 10 is positioned on the reference object 18, the optical displacement detection system 40 detects the presence of the reference object 18 and automatically enables the icon pointing mode. Thereafter, the optical displacement detection system 40 detects the movement of the computer accessory 10 with respect to the reference object 18 and produces displacement data that are indicative of the movement of the computer accessory 10. The displacement data may be converted, if necessary, by a displacement processing system 60 (FIG. 4) to produce icon pointing data suitable for use by the host computer 30. The icon pointing data are transmitted to the host computer 30 via the data transmission system 32, whereupon the icon pointing data are used to move the position of the pointer or icon displayed on the display device associated with the host computer system 30. When the computer accessory 10 is operated in the icon pointing mode, the user may also operate the mouse buttons 22, 24 and the scroll wheel 26 as desired thereby allowing the computer accessory 10 to fully emulate a conventional computer mouse system.

A second operational mode that is provided is referred to herein as a camera mode. When operated in the camera mode, the computer accessory 10 emulates a digital camera. That is, the user may operate the computer accessory 10 to capture a digital image (i.e., photograph) of a selected object 44 (FIG. 4). In the embodiment shown and described herein, the camera mode is automatically enabled when the user removes or lifts the computer accessory 10 from the reference object 18 (e.g., the mouse pad 20). That is, the optical displacement detection system 40 detects the absence of the reference object 18 and automatically switches the computer accessory 10 to the camera mode. The user may then simply point the lens assembly 46 (FIG. 2) provided on the bottom surface 16 of the housing 12 toward the selected object 44 (FIG. 4). When the user actuates the shutter release 28, the imaging system 42 captures a digital image of the selected object 44 and produces image data representative of the selected object 44. Thereafter, the image data is transferred or downloaded to the host computer system 30 via the data transmission system 32.

The computer accessory 10 may be provided with an applications software package (not shown) to provide enhanced functionality. For example, in the embodiment shown and described herein, the applications software package allows the computer accessory 10 to be operated in accordance with the method 80 illustrated in FIG. 5. Briefly, the method 80 allows the user to place image data captured by the computer accessory at a desired location in an application being run on the host computer system 30 by simply moving the icon or cursor to the desired location and then by using the computer accessory 10 to take a picture of the selected object.

In the first step 82 of the method 80, the applications software package allows the computer accessory 10 to emulate a conventional computer pointing device or mouse in the manner already described. That is, the user may use the computer accessory 10 to move the icon or cursor displayed on the host computer system 30 to a desired location. For example, if the user is running a word processing program on the host computer 30 and desires to place a photograph (i.e., image data captured by the computer accessory 10) at a desired location in the document, the user would perform step 82 to place the icon or cursor at the desired location within the document.

After the user has moved the cursor to the desired location, he or she would then proceed to step 84 and lift the computer accessory 10 from the reference object 18 (FIGS.

1, 3, and 4). As discussed above, so lifting the computer accessory 10 causes the accessory 10 to switch from the icon pointing mode of operation to the camera mode of operation. Then, the user may perform step 86 to take a picture (i.e., photograph) the selected object 44 (FIG. 4). When the user actuates the shutter release 28 (FIGS. 1 and 4), the applications software will cause the image data to be displayed on the host computer system 30 at the desired location. That is, the photograph will be displayed where the cursor was located. Finally, the user may replace the computer accessory 10 on the reference object 18 at step 88 in order to resume the icon pointing mode.

A significant advantage of the present invention is that the computer accessory 10 provides both an icon pointing function and a camera function in a single unit. Consequently, the computer accessory according to the present invention allows a user to readily implement both functions without the need to provide two separate devices and without the need to connect the two separate devices to the host computer system 30. Stated another way, the present invention achieves both the function of a computer pointing device (i.e., a mouse) and a digital camera while maintaining the simplicity of operation of the familiar and ubiquitous computer mouse.

Another advantage of the present invention is that since the computer accessory 10 encourages users to take quick candid photos or "snap shots" while working on the host computer system (e.g., typically for the purposes of E-mailing the images to friends and family), the resolution provided by the imaging system 42 need not be as high as the resolution that is typically provided by most stand-alone digital cameras. Consequently, the computer accessory 10 of the present invention may utilize relatively inexpensive imaging components, thereby allowing the user to have access to the digital photographic function without incurring the expense of a stand-alone digital camera.

Still other advantages are associated with the automatic mode switching function provided by the computer accessory 10. For example, the automatic mode switching function of the present invention allows for the easy and intuitive switching between the operational modes of the computer accessory 10. That is, since the user simply places the computer accessory 10 on the reference object 18 to use it as a mouse and simply lifts the accessory 10 from the reference object 18 to use it as a camera, the present invention dispenses with the need for the user to memorize special command sequences or to pull-down and activate special menu items in order to operate the computer accessory 10.

Additional advantages stem from the applications software package which may be provided with the computer accessory 10. For example, the applications software package allows the user to easily import images into a document or file on which the user is working by simply moving the cursor to the desired location and then by using the computer accessory 10 to take a picture of the selected object 44. The image of the selected object 44 will be automatically displayed at the desired location.

Having briefly described one embodiment of the computer accessory 10, as well as some of its more significant features and advantages, the various embodiments of the computer accessory according to the present invention will now be described in detail.

Referring back now to FIGS. 1–3, the computer accessory 10 according to one preferred embodiment of the present invention may be provided with a housing 12 having a top surface 14 and a bottom surface 16 that are joined together so that they define an interior cavity or region 37 (FIG. 3). The interior cavity or region 37 is sized to receive the various systems and components comprising the computer accessory 10. In the embodiment shown and described herein, the top surface 14 of housing 12 may comprise a curved surface shaped to comfortably receive the hand (not shown) of the user. Alternatively, other shapes are possible, as would be obvious to persons having ordinary skill in the art. The bottom surface 16 of the housing 12 may comprise a generally planar or flat surface that is configured to slide easily along a reference object 18, such as mouse pad 20. However, as will be described in greater detail below, the bottom surface 16 of housing 12 need not necessarily comprise a flat surface if the icon pointing system 38 comprises a track ball (not shown) or other type of pointing system.

The housing 12 may be made from any of a wide range of materials, such as metals or plastics, suitable for the intended application. Consequently, the present invention should not be regarded as limited to a housing 12 fabricated from any particular material or type of material. However, by way of example, in one preferred embodiment, the housing 12 may be molded from a polycarbonate plastic material of the type that is well known in the art and readily commercially available. Alternatively, of course, other types of plastic materials could also be used, as would be obvious to persons having ordinary skill in the art after having become familiar with the teachings of the present invention.

Since it is desirable for the computer accessory 10 to emulate a conventional computer pointing system or mouse, the housing 12 of computer accessory 10 also may be provided with one or more mouse buttons 22, 24. The mouse buttons 22, 24 allow the computer device 10 to be operated in a manner akin to the ubiquitous and familiar computer mouse. It is generally preferred, but not required, to also provide the computer accessory 10 with a scroll wheel 26. Scroll wheel 26 provides for increased functionality and ease of use when the computer accessory 10 is used with a computer system 30 and/or software that supports scroll wheels. Of course, the exact number of mouse buttons 22, 24, and their locations on the housing 12 may vary depending on the particular application and structural design of the computer accessory 10. Similarly, the scroll wheel 26 may also be placed at any convenient location on the housing 12 of computer accessory 10. Accordingly, the present invention should not be regarded as limited to the particular configuration of the mouse buttons 22, 24 and scroll wheel 26 that is shown and described herein.

Since the computer accessory 10 may also be operated as a digital camera, it is preferred to provide the computer accessory 10 with a shutter release button 28 positioned at a suitable location on the housing 12. For example, in the embodiment shown and described herein, the shutter release button 28 is located on the side portion of the housing 12. This position allows the shutter release button 28 to be conveniently operated by the thumb of the user. Alternatively, the shutter release button 28 may be positioned at any other convenient location on the housing 12, as would be obvious to persons having ordinary skill in the art after having become familiar with the teachings of the present invention.

With reference now primarily to FIG. 4, the computer accessory 10 may be connected to the host computer system 30 by a data transmission system 32. The data transmission system 32 transmits to the host computer system 30 both icon pointing data (not shown) and image data (not shown)

produced by the computer accessory 10. Accordingly, the data transmission system 32 may comprise any of a wide range of data transmission systems (e.g., wired bus systems or wireless (e.g., infra-red) bus systems) that are now known in the art or that may be developed in the future that are or would be suitable for transmitting to the host computer 30 the icon pointing data and the image data. By way of example, the data transmission system 32 utilized in one preferred embodiment of the invention may comprise a universal serial bus (USB) transmission system having a universal serial bus interface 34. In accordance with the USB data transmission system, power and data are provided to and from the USB interface 34 via cable system 36.

Since USB data transmission systems are well-known in the art and could be easily provided by persons having ordinary skill in the art after having become familiar with the teachings of the present invention, the particular USB interface 34 utilized in one preferred embodiment of the invention will not be described in further detail herein.

As was mentioned above, other types of data transmission systems may be used to transfer data between the computer accessory 10 and the host computer system 30. For example, in another embodiment, the data transmission system 32 may comprise a wireless (e.g., infra-red) serial data transmission system. If so, the computer accessory 10 would need to be provided with a separate power supply system since wireless data transmission systems do not transmit electrical power. Examples of separate power supply systems include on-board battery systems and separate power supplies that are electrically connected to the computer accessory 10 via a cable or other means.

The icon pointing system 38 is best seen in FIG. 4 and may comprise any of a wide range of systems for producing icon pointing data suitable for use by the host computer system 30. In one embodiment, the icon pointing system 38 comprises an optical displacement detection system 40 that may be implemented by means of electronic circuits and components 74 provided on a flexible printed wiring board 76 supported within the housing 12. See FIG. 3.

The optical displacement detection system 40 may comprise any of a wide range of systems known in the art for detecting the relative movement of the computer accessory 10 and the reference surface 18 (e.g., mouse pad 20) by optically detecting and tracking the location of structural features contained on the surface of reference object 18. Examples of optical displacement detection systems that could be utilized in the present invention are shown and described in U.S. Pat. No. 5,089,712, entitled "Sheet Advancement Control System Detecting Fiber Pattern of Sheet" and U.S. Pat. No. 5,578,813, entitled "Freehand Image Scanning Device which Compensates for Non-Linear Movement," both of which are specifically incorporated herein by reference for all that they disclose.

Briefly, the optical displacement detection system 40 of the type shown and described in the foregoing U.S. patents may comprise an illumination system 48, such as a light emitting diode 50, for directing light rays 52 onto the reference object 18. A lens or focusing system 54 collects light 56 reflected by the reference object 18 and focuses the light 56 onto an optical sensor 58 which is connected to a displacement processing system 60. The displacement processing system 60 may be connected to a DRAM memory subsystem 62 and a flash memory subsystem 64. Such memory systems 62, 64 provide data storage for the displacement processing system 60.

The optical sensor 58 is responsive to structural features contained on the surface of the reference object 18. For example, if the reference object 18 comprises the mouse pad 20, the structural features may be certain texture or fiber patterns contained on the surface of the mouse pad 20. Alternatively, if the reference object 18 comprises a glossy material, the inherent structural features may comprise specular reflection fields produced by the illumination system 48. In any event, the output signal produced by the optical sensor 58 is processed by the displacement processing system 60 to produce displacement data (not shown) that are related to or indicative of the movement of the computer accessory 10 with respect to the reference object 18. The displacement data may comprise icon pointing data suitable for direct use by the computer system 30. Alternatively, if the displacement data are not suitable for use directly by the computer system 30, the displacement processing system 60 may further process the displacement data as required to produce icon pointing data that are suitable for use by the host computer system 30.

Since optical displacement detection systems of the type shown and described herein are well-known in the art and could be readily provided by persons having ordinary skill in the art after becoming familiar with the teachings of the present invention, the particular optical displacement detection system that is utilized in one preferred embodiment of the present invention will not be described in further detail herein.

As was discussed above, the icon pointing system 38 could also comprise other systems that are now known in the art or that may be developed in the future for producing icon pointing data suitable for use by the host computer system 30. For example, in another preferred embodiment of the present invention, the icon pointing system 38 comprises a conventional mechanical displacement detection system (not shown) of the type commonly used in so-called "first generation" computer mouse systems. Such mechanical displacement detection systems typically utilize a ball that is freely rotatable within a socket provided in the mouse housing. As the mouse is moved over the reference object or surface (e.g., a mouse pad) the ball rotates. A detection system operatively associated with the ball detects the rotation of the ball, thus provides an indication of the displacement of the mouse with respect to the mouse pad.

In still another embodiment, the icon pointing system 38 comprises a track ball pointing system (not shown). Track ball pointing systems are well-known in the art and differ from displacement detection systems (e.g., either optical or mechanical displacement systems) in that they measure the movement of a track ball relative to the track ball housing. That is, the housing of a track ball system does not need to be moved across a reference surface. Track ball pointing systems are therefore convenient if space is limited.

The imaging system 42 is best seen in FIGS. 3 and 4 and may comprise a two dimensional optical sensor 66, a lens system 68, and an image processing system 70. The optical sensor 66 is responsive to light 72 reflected by the selected object 44 and produces an output signal that is representative of the selected object 44. The optical sensor 66 may be mounted to the flexible printed wiring board 76 that may be secured within the housing 12 of computer accessory 10. The optical sensor 66 may comprise a two-dimensional CCD photosensor array of the type that is well-known in the art and readily commercially available. Consequently, the present invention should not be regarded as limited to any particular type of optical sensor 66. However, by way of example, in one preferred embodiment, the optical sensor 66 may comprise a two-dimensional CCD array, such as type TCD5120AC available from Toshiba of Japan. If a CCD sensor is used, the imaging system 42 may also be provided with an analog to digital (A/D) converter 78 to convert the analog signals produced by the CCD 66 to digital signals suitable for use by the image processing system 70. A/D converter 78 may be implemented by means of electronic circuits and components 74 provided on the flexible printed wiring board 76.

The lens assembly 68 may comprise any of a wide range of lens assemblies that are well-known in the art and readily commercially available. For example, in one preferred embodiment, the lens assembly 68 may comprise a lens assembly available from Pentax Corp. of Japan. The lens assembly 68 may be mounted to the housing 12 according to any of a wide variety of mounting systems and methods well-known in the art. Optionally, the lens system 68 may be provided with a zoom magnification system and/or an aperture control system to provide increased utility, although such systems are not required.

The image processing system 70 may be implemented by means of electronic circuits and components 74 provided on the flexible printed wiring board 76. See FIG. 3. By way of example, the image processing system 70 utilized in one preferred embodiment of the invention comprises a microprocessor-based image processing system of the type that is well-known in the art. The image processing system 70 may be connected to the DRAM memory system 62 and/or the flash memory system 64 in order to provide the data storage capacity that may be required by the image processing system 70. The shutter release button 28 may be operatively connected to the image processing system 70 so that the image processing system 70 captures an image of the selected object 44 when the shutter release button 28 is depressed.

Since imaging systems of the type utilized in digital cameras are well-known in the art and could be easily provided by persons having ordinary skill in the art after having become familiar with the teachings of the present invention, the imaging system 42 and related components (e.g., lens system 68, image sensor 66, A/D converter 78, and image processor 70) that may be utilized in one preferred embodiment of the present invention will not be described in further detail herein.

As was briefly mentioned above, the computer accessory 10 according to the present invention may be operated in either an icon pointing mode or a camera mode. When operated in the icon pointing mode, the computer accessory 10 emulates a conventional computer pointing device or mouse. In the embodiment shown and described herein, the icon pointing mode is automatically enabled when the computer accessory 10 is placed on the reference object 18 (e.g., the mouse pad 20). When so positioned, the optical displacement detection system 40 detects the presence of the reference object 18 and enables the icon pointing mode. Alternatively, other methods and devices (e.g., separate switches) may be used to switch between modes, as would be obvious to persons having ordinary skill in the art after having become familiar with the present invention.

Regardless of the particular manner that is utilized to switch between the camera and icon pointing modes, when the computer accessory 10 is operated in the icon pointing mode the optical displacement detection system 40 detects the movement of the computer accessory 10 with respect to the reference object 18 and produces displacement data that are indicative of the movement of the computer accessory 10. The displacement data are converted, if necessary, by the displacement processing system 60 to produce icon pointing data suitable for use by the host computer 30. The icon pointing data are then transmitted to the host computer 30 via the data transmission system 32, whereupon the host computer 30 uses the icon pointing data to move the position of the pointer or icon which may be displayed on the display device associated with the host computer system 30. When operated in the icon pointing mode, the user may also operate the mouse buttons 22, 24 and the scroll wheel 26, thereby allowing the computer accessory 10 to fully emulate a conventional computer mouse system.

The computer accessory 10 may be operated in the camera mode in order to capture a digital image of a selected object 44 (FIG. 4). In the embodiment shown and described herein, the camera mode is automatically enabled when the computer accessory 10 is removed from the reference object 18, i.e., when the optical displacement detection system no longer detects the presence of the reference object 18. The user may then simply point the lens assembly 46 (FIG. 2) provided on the bottom surface 16 of the housing 12 toward the selected object 44 (FIG. 4). When the user actuates the shutter release 28, the imaging system 42 captures a digital image of the selected object 44 and produces image data representative of the selected object 44. Thereafter, the image data may be transferred or downloaded to the host computer system 30 via the data transmission system 32. In an alternate embodiment, the image data captured by the imaging system 42 may be continuously transferred to the host computer 30 which may then display the continuously updated image data on the display device associated with the host computer system 30. When the user is satisfied with the image, he or she may depress the shutter release 28, thereby capturing or creating a still frame of the displayed image.

The computer accessory 10 may be provided with an applications software package (not shown) to provide enhanced functionality. For example, in one preferred embodiment, the applications software package allows the computer accessory 10 to be operated in accordance with the method 80 illustrated in FIG. 5. Method 80 allows the user to place image data captured by the computer accessory at any convenient place in the document or file currently open on the host computer system 30.

Figure 5:
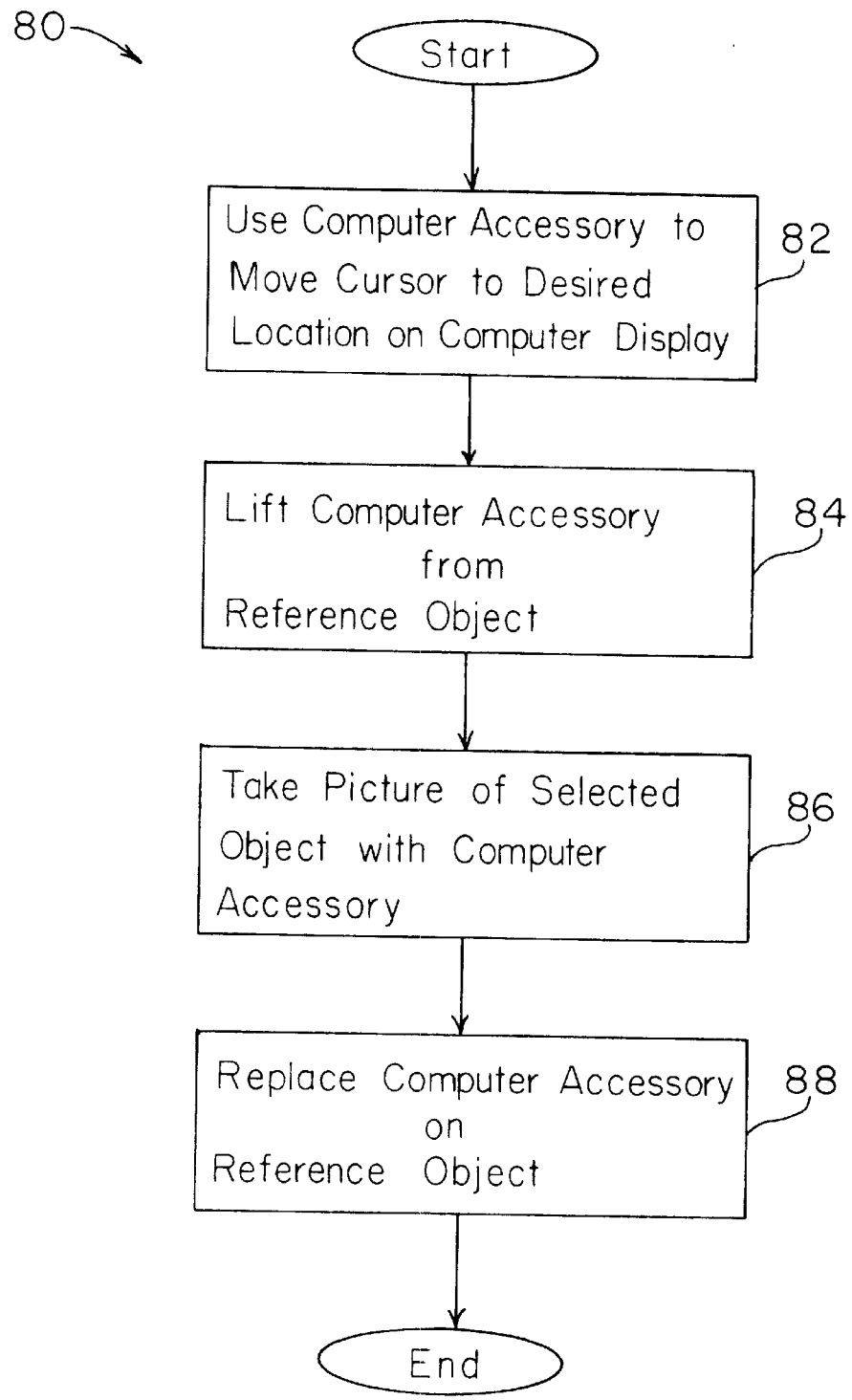
FIG. 5 is a flow diagram of a method for using the computer accessory.

Referring now to FIG. 5, in the first step 82 of the method 80, the applications software allows the computer accessory 10 to emulate a conventional computer pointing device or mouse in the manner already described. That is, the user may use the computer accessory 10 to move the icon or cursor displayed on the host computer system 30 to a desired location. For example, if the user is running a word processing program on the host computer 30 and desires to place a photograph (i.e., image data captured by the computer accessory 10) at a selected location in the document or file, the user would perform step 82 to place the icon or cursor at the selected location within the document or file. In another example, if the user is running an E-mail program and desires to place the photograph in the E-mail file, the user would perform step 82 to place the cursor at the appropriate location in the E-mail file.

After the user has moved the cursor to the desired location in the open document or file, he or she would then proceed to step 84. That is, the user would lift the computer accessory 10 from the reference object 18 (FIGS. 1, 3, and 4). So lifting the computer accessory 10 causes the accessory 10 to automatically switch to the camera mode of operation. The user then may perform step 86 to take a picture (i.e., photograph) the selected object 44 (FIG. 4). When the user actuates the shutter release 28 (FIGS. 1 and 4), the applications software will cause the image data to be displayed on the host computer system 30 at the selected location. That is, the photograph will be displayed where the cursor was located. Finally, the user may replace the computer accessory 10 on the reference object 18 at step 88 in order to resume the icon pointing mode.

It is contemplated that the inventive concepts herein described may be variously otherwise embodied and it is intended that the appended claims be construed to include alternative embodiments of the invention except insofar as limited by the prior art.

What is claimed is:

1. A computer accessory for use with a host computer, comprising:

a housing;

an icon pointing system mounted within said housing, said icon pointing system generating icon pointing data during selected times, the icon pointing data being used to control a position of an icon associated with the host computer;

an imaging system mounted within said housing, said imaging system producing image data during selected times, the image data being representative of an image of a selected object;

a mode selection system operatively associated with said icon pointing system and said imaging system, said mode selection system automatically selecting between an icon pointing mode and a camera mode; and a data transmission system operatively associated with said icon pointing system and said imaging system, said data transmission system transmitting to the host computer the icon pointing data and the image data.

2. The computer accessory of claim 1, wherein said icon pointing system comprises an optical displacement detection system, said optical displacement detection system detecting movement of said computer accessory with respect to a reference object.

3. The computer accessory of claim 2, wherein said optical displacement detection system comprises:

an illumination system, said illumination system directing light onto the reference object;

an optical sensor responsive to light reflected by the reference object;

a focusing system positioned between said optical sensor and the reference object, said focusing system collecting and focusing light reflected by the reference object onto said optical sensor; and a displacement processing system operatively associated with said optical sensor, said displacement processing system producing displacement data indicative of the movement of said computer accessory with respect to the reference object, the displacement data comprising icon pointing data.

4. The computer accessory of claim 1, wherein said icon pointing system comprises a mechanical displacement detection system, said mechanical displacement detection system detecting movement of said computer accessory with respect to a reference object.

5. The computer accessory of claim 1, wherein said icon pointing system comprises a track ball.

6. The computer accessory of claim 1, wherein said imaging system comprises:

a two-dimensional array of optical sensor elements;

a lens positioned adjacent said two-dimensional array of optical sensor elements, said lens focusing onto said two-dimensional array of optical sensor elements light reflected by the selected object; and an image processing system operatively associated with said two-dimensional array of optical sensor elements, said image processing system producing the image data representative of the image of the selected object.

7. The computer accessory of claim 6, wherein said data transmission system comprises a serial data bus.

8. The computer accessory of claim 7, wherein said serial data bus comprises a universal serial bus.

9. The computer accessory of claim 7, wherein said serial data bus comprises a wireless infrared communication system.

10. A computer accessory, comprising:

a housing configured to be moved along a reference object;

an illumination system mounted within said housing so that said illumination system directs light onto the reference object;

an optical sensor mounted within said housing, said optical sensor being responsive to light reflected by the reference object;

a focusing system mounted within said housing between said optical sensor and the reference object, said focusing system collecting and focusing light reflected by the reference object onto said optical sensor;

a displacement processing system mounted within said housing, said displacement processing system being operatively associated with said optical sensor and producing displacement data indicative of the movement of said computer accessory with respect to the reference object;

a two-dimensional array of optical sensor elements mounted within said housing;

a lens system mounted within said housing so that said lens system is adjacent said two-dimensional array of optical sensor elements, said lens system focusing onto said two-dimensional array of optical sensor elements light reflected by a selected object;

an image processing system mounted within said housing, said image processing system being operatively associated with said two-dimensional array of optical sensor elements, said image processing system producing image data representative of the selected object; and a mode selection system operatively associated with said displacement processing system and said image processing system, said mode selection system automatically selecting an icon pointing mode when said computer accessory is operatively positioned next to the reference object.

11. The computer accessory of claim 10, further comprising a data transmission system operatively associated with said displacement processing system and said image processing system, said data transmission system transmitting to a host computer the displacement data and the image data.

12. The computer accessory of claim 11, wherein said data transmission system comprises a serial data bus.

13. A computer accessory for use with a host computer, comprising:

a housing;

icon pointing means mounted within said housing for producing icon pointing data for controlling a position of an icon associated with the host computer;

imaging means mounted within said housing for detecting image light reflected by a selected object and for producing image data representative of the selected object;

mode selection means operatively associated with said icon pointing means and said imaging means for automatically selecting between an icon pointing mode and a camera mode; and data transmission means operatively associated with said icon pointing means and said imaging means for transmitting to a host computer the icon pointing data and the image data.

14. The computer accessory of claim 13, wherein said icon pointing means comprises optical displacement detection means for detecting the movement of said computer accessory with respect to a reference object.

15. The computer accessory of claim 13, wherein said imaging means comprises:

two-dimensional optical sensor means for receiving light reflected by the selected object and for producing electrical signals related thereto;

lens means operatively associated with said two-dimensional optical sensor means for focusing light reflected by the selected object onto said two-dimensional optical sensor means; and image processing means operatively associated with said two-dimensional optical sensor means for producing the image data from the electrical signals produced by said two-dimensional optical sensor means.

16. A method for operating a computer accessory, comprising:

during a selected time, using said computer accessory as a pointing device to control a position of an icon displayed on a display device associated with a host computer connected to said computer accessory; and during another selected time, using the computer accessory as a camera to capture an image of a selected object, said computer accessory automatically switching between an icon pointing mode and a camera mode.

17. The method of claim 16, further comprising transferring to the host computer image data representative of the image of the selected object.

18. A method for operating a computer accessory, comprising:

using the computer accessory as a pointing device to move an icon on a display device associated with a host computer connected to the computer accessory to a desired location on the display device;

using the computer accessory as a camera to capture an image of a selected object and to produce image data relating thereto, said computer accessory automatically switching between an icon pointing mode and a camera mode; and displaying the image data at the desired location on the display device associated with the host computer.

* * * * *